US005924041A

United States Patent [19]
Alperovich et al.

[11] Patent Number: 5,924,041
[45] Date of Patent: Jul. 13, 1999

[54] METHOD AND APPARATUS FOR PROVIDING A DISPATCH SYSTEM IN A CELLULAR RADIOTELEPHONE SYSTEM

[75] Inventors: Vladimir Alperovich, Dallas; Eric Valentine, Plano, both of Tex.

[73] Assignee: Ericsson Inc., Research Triangle Park, N.C.

[21] Appl. No.: 08/755,171

[22] Filed: Nov. 25, 1996

[51] Int. Cl.⁶ .................................................. H04Q 9/00
[52] U.S. Cl. ........................ 455/456; 455/433; 455/445; 455/519; 455/560
[58] Field of Search .................................. 455/414, 416, 455/422, 432, 433, 445, 456, 517–520, 462, 465, 506, 560

[56] References Cited

U.S. PATENT DOCUMENTS

| | | | |
|---|---|---|---|
| 4,399,555 | 8/1983 | MacDonald et al. | 455/33 |
| 4,968,966 | 11/1990 | Jasinski et al. | 340/825 |
| 5,054,110 | 10/1991 | Comroe et al. | 455/33 |
| 5,095,529 | 3/1992 | Comro et al. | 455/432 |
| 5,179,721 | 1/1993 | Comroe et al. | 455/426 |
| 5,239,674 | 8/1993 | Comroe et al. | 455/426 |
| 5,313,654 | 5/1994 | Comroe et al. | 455/426 |
| 5,335,350 | 8/1994 | Felderman et al. | 455/17 |
| 5,369,684 | 11/1994 | Buhl et al. | 455/432 |
| 5,371,898 | 12/1994 | Grube et al. | 455/426 |
| 5,387,905 | 2/1995 | Grube et al. | 340/825 |
| 5,416,770 | 5/1995 | Stoner et al. | 370/60 |
| 5,423,061 | 6/1995 | Fumarolo et al. | 455/54 |
| 5,448,619 | 9/1995 | Evans et al. | 379/58 |
| 5,450,405 | 9/1995 | Maher et al. | 370/58 |
| 5,457,809 | 10/1995 | Ohnishi | 455/33 |
| 5,465,391 | 11/1995 | Toyryla | 455/422 |
| 5,491,835 | 2/1996 | Sasuta et al. | 455/17 |
| 5,493,286 | 2/1996 | Grube et al. | 455/38 |
| 5,506,837 | 4/1996 | Söllner et al. | 455/518 |
| 5,512,885 | 4/1996 | Agestam et al. | 340/825 |
| 5,513,381 | 4/1996 | Sasuta | 455/34 |
| 5,548,631 | 8/1996 | Krebs et al. | 455/426 |
| 5,564,071 | 10/1996 | Hou et al. | 455/520 |
| 5,594,777 | 1/1997 | Makkonen et al. | 455/462 |
| 5,613,209 | 3/1997 | Peterson et al. | 455/518 |
| 5,678,180 | 10/1997 | Mehta et al. | 455/517 |
| 5,699,407 | 12/1997 | Nguyen | 455/462 |
| 5,839,072 | 11/1998 | Chien | 455/445 |

FOREIGN PATENT DOCUMENTS 0 727 914  8/1996  European Pat. Off. .
WO 95/35001  12/1995  WIPO .

OTHER PUBLICATIONS

PCT Search Report, Aug. 5, 1998, PCT/US 97/22235.

*Primary Examiner*—Willis R. Wolfe
*Assistant Examiner*—Hieu T. Vo
*Attorney, Agent, or Firm*—Jenkens & Gilchrist P.C.

[57] ABSTRACT

A method and apparatus for providing a dispatch system in a cellular radiotelephone system. Membership in a dispatch group is implicitly created by assigning a common telephone number to all members of the dispatch group and/or explicitly by association of the mobile stations with one or more dispatch groups in a centralized database of a cellular telephone network. A telephone call placed by a dispatcher or mobile stations having membership in the dispatch group results in the cellular telephone network contacting each of the members of the dispatch group to create a full duplex conference call between all members of the dispatch group. In one embodiment of the present invention, the telephone calls to the mobile stations are conferenced together at the gateway to the cellular telephone network, and in another embodiment of the present invention, the telephone calls to the mobile stations are hierarchically conferenced together.

14 Claims, 7 Drawing Sheets

| Subscriber | MSISDN | IMSI | Location Information | ..... | Group Association |
|---|---|---|---|---|---|
| Mobile Station 1 | | | | | |
| Mobile Station 2 | | | | | |
| ⋮ | | | | | |
| Mobile Station n | | | | | |

METHOD AND APPARATUS FOR PROVIDING A DISPATCH SYSTEM IN A CELLULAR RADIOTELEPHONE SYSTEM

BACKGROUND OF THE INVENTION

1. Technical Field of the Invention

The present invention pertains in general to dispatch systems and cellular telephone networks, and more particularly, to a method and apparatus for deploying a dispatch system using group lists and standard radiotelephone networks.

2. Description of Related Art

The use of cellular telephones has increased dramatically in the past several years and demand for cellular telephone service is expected to continue growing into the future. The radio frequency spectrum used by cellular telephone networks and other wireless services, however, is a limited resource. There is a need, therefore, to utilize the radio frequency spectrum as efficiently as possible. While the various cellular telephone network standards have evolved into increasingly more efficient approaches to using the radio frequency spectrum, other wireless services which share the radio frequency spectrum with the cellular telephone networks have not. One such group of wireless services comprises dispatch systems commonly used by mobile fleets such as taxis and delivery trucks.

Dispatch systems generally comprise a single dispatch center communicating with multiple mobile units (e.g., taxis or trucks) using radios. This "point-to-multipoint" communication is usually half duplex as only the dispatch center or one of the mobile units can transmit at any given time. This is in contrast to the full duplex and "point-to-point" communication of cellular telephone networks. Frequently, the radio spectrum allotted to a dispatch system provides capacity in excess of what is actually needed by the dispatch service. Furthermore, during non-peak times, few transmissions occur and the allotted radio frequency remains under utilized.

Radio frequency bands used by dispatch systems sometimes occupy portions of the radio frequency spectrum which could be used to provide cellular telephone service. Use of the radio frequency band allocated to dispatch services for cellular telephone service would provide communication for a greater number of individuals, provide more efficient use of a limited resource, and increase the communication capacity of the radio frequency band. Before the radio frequency band can be reallocated for use by cellular telephone networks, however, a method of communication must be provided to the users of the displaced dispatch system. Systems have been developed which address the issue of group calls associated with dispatch systems in cellular telephone networks. However, none have disclosed a method or apparatus for providing a dispatch system in a cellular telephone network using current cellular telephone network standards and requiring no special equipment. It would be advantageous, therefore, to devise a method and apparatus using a cellular telephone network to provide dispatch communication capabilities consistent with the point-to-multipoint nature of current dispatch systems.

SUMMARY OF THE INVENTION

The present invention comprises a method and apparatus for providing a dispatch system in a cellular telephone network using a dispatch call group. In the present invention, each mobile unit which is part of a given dispatch system (e.g., taxis and delivery trucks) is equipped with a cellular telephone, also referred to as a "mobile station." Each of the mobile stations and one or more dispatch centers are listed in a centralized database of the cellular telephone network as having membership in the particular dispatch group and are assigned a common telephone number. When communication with the dispatch group is to be established, the caller places a telephone call using the telephone number assigned to the dispatch group. The cellular telephone network receives the telephone call through a gateway facility. This gateway facility has access to the centralized database and can determine all mobile stations having membership in the particular dispatch group. The cellular telephone network establishes a telephone call with each of the mobile stations having membership in the dispatch group, and conferences together all mobile stations which have been contacted together with the incoming call. The conferencing of calls can occur at the gateway facility or can be a hierarchal conferencing using conferencing capabilities at both the gateway facility and various communication points throughout the cellular telephone network.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Although the method and apparatus of the present invention can be practiced using any one of the cellular telephone network protocols, the preferred embodiment of the present invention is described as being deployed using the Global System for Mobile communication (GSM) standard.

Figure 1:
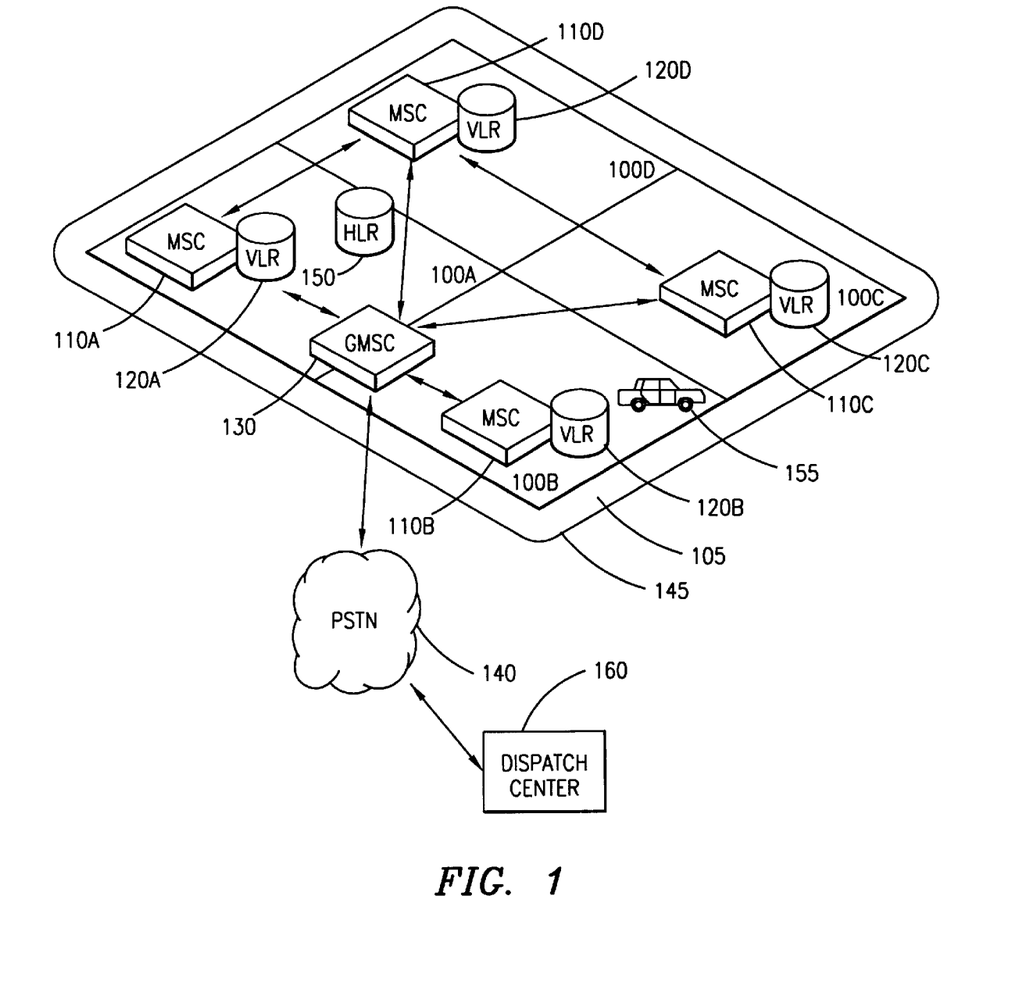
FIG. 1 illustrates a cellular telephone network service area subdivided into four mobile switching center service areas.

Referring now to FIG. 1, there is illustrated a cellular telephone network service area 105 subdivided into four mobile switching center service areas 100. While the geographical area 105 serviced by the public land mobile network 145 providing cellular telephone service can be subdivided into a plurality of service areas 100, FIG. 1 depicts a telephone network service area 105 as being divided into four service areas 100A, 100B, 100C, and 100D. Each service area 100 is supported by its own Mobile Switching Center (MSC) 110A, 110B, 110C, and 110D, respectively. Each mobile switching center 110 in turn has an associated Visitor Location Register (VLR) 120A, 120B, 120C, and 120D, respectively.

Also included in the cellular telephone network is a Gateway Mobile Switching center 130. The gateway mobile center 130 can be stand alone, can service its own service area 100 of the cellular telephone network 145, or can be co-located with another mobile switching center and visitor location register. In either case, the gateway mobile switching center 130 provides a gateway for communication between the Public Switched Telephone Network (PSTN) 140 and the cellular telephone network 145. Additionally, all telephone calls from one mobile station to another mobile station are routed through the gateway mobile switching center 130. Each of the mobile switching centers 110A–D in the cellular telephone network 145 can communicate with all other mobile switching centers including the gateway mobile switching center 130 either directly from one mobile switching center to another or by routing through a tandem mobile switching center. However, communication to a mobile station 155 from the public switched telephone network 140 or communication between two mobile stations occurs via the gateway mobile switching center 130.

Figure 2:
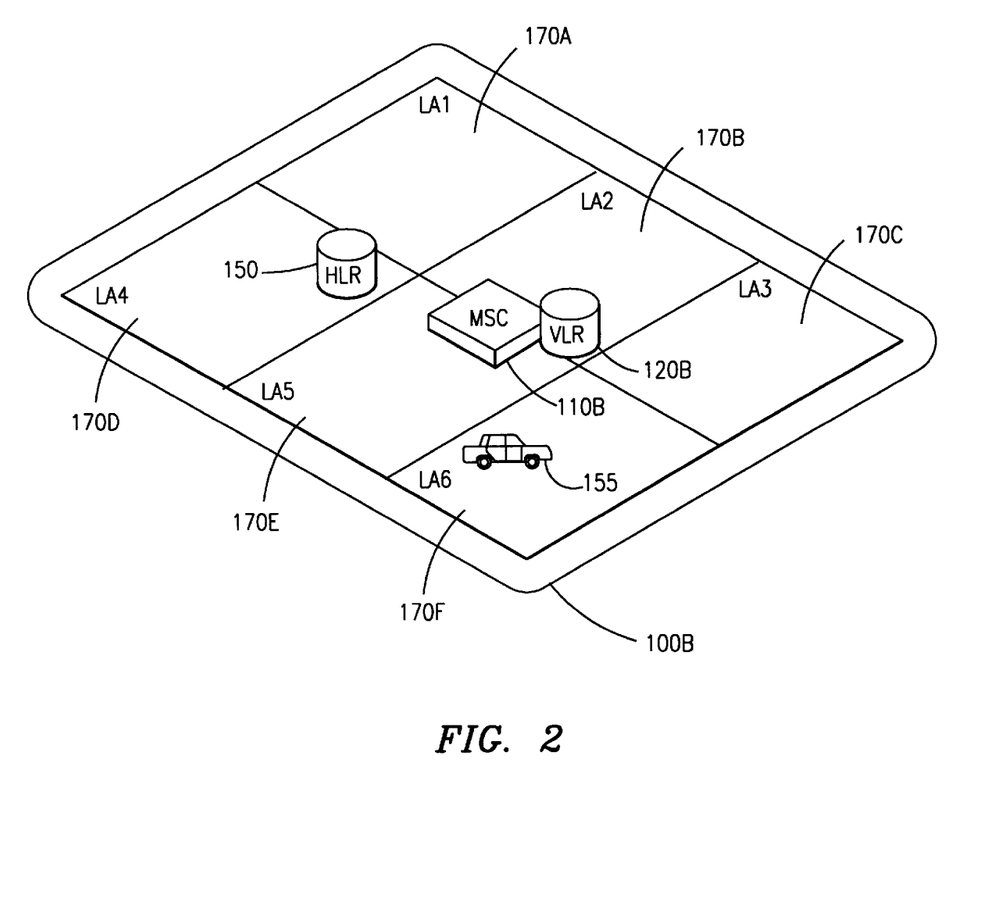
FIG. 2 illustrates a service area of a mobile switching center subdivided into a plurality of location areas.

Referring additionally to FIG. 2, there is illustrated a service area 100 of a mobile switching center 110 subdivided into a plurality of location areas (LA) 170. Each of the mobile switching center service areas 100A–D of the cellular telephone network 145 can be further subdivided into several location areas (LA). In FIG. 2, the mobile switching center service area 100B of FIG. 1, has been divided into six location areas, LA1 170A, LA2 170B, LA3 170C, LA4 170D, LA5 170E, and LA6 170F. Mobile subscribers can move freely within a location area (LA) without requiring the updating of location information in the visitor location register 120B and the home location register 150.

Each mobile switching center can also communicate with a Home Location Register (HLR) 150. The home location register 150 contains a database listing, among other subscriber information, the identity of all subscribers to the cellular telephone network 145 and their last known geographical location in terms of the mobile switching center and visitor location register currently servicing the mobile station as a result of the mobile station's presence in that locality. For example, in FIG. 1 the mobile station 155 is in service area 100B serviced by mobile switching center 110B associated with visitor location register 110B. Therefore, home location register 150 lists mobile station 155 as located in the service area 100B serviced by mobile switching center 110B and further lists mobile station 155 as located in the particular location area (LA) within service area 100B where the mobile station 155 is located. The information contained in the database of the home location register 150 regarding the mobile station 155 is duplicated in the visitor location register 120B of the mobile switching center 100B currently providing service to the mobile station 155. As the location of the mobile station 155 changes, the information in the visitor location register 120B is updated. If the mobile station 155 moves from a location area in service area 100B to another location area in service area 100C for example, the database of the home location register 150 would be updated, visitor location register 120B deletes entries concerning mobile station 155 and visitor location register 120C adds entries concerning mobile station 155. This procedure is no different than what is currently preformed in the Global System for Mobile communications standard.

When a caller from outside the cellular telephone network 145, such as a dispatch center 160, wishes to place a call to a mobile subscriber 155, the calling party (in this case the dispatch center 160) places a telephone call to the mobile subscriber 155. The call is routed by the public switched telephone network 140 to the gateway mobile switching center 130, and the gateway mobile switching center 130 then routes the call to the particular mobile switching center 110B providing cellular telephone service to the mobile station 155 based on the location information contained in the home location register 150 database.

Figure 3:
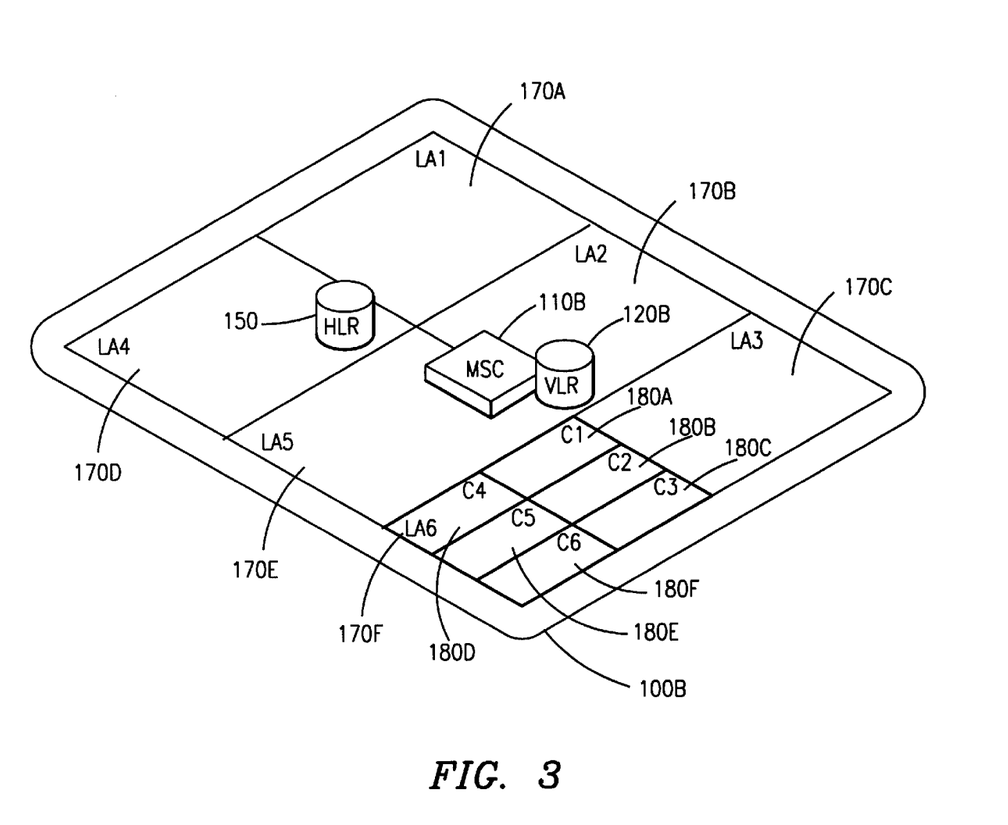
FIG. 3 illustrates the division of a mobile switching center service area into a plurality of location areas with a location area further divided into a plurality of cells.

Referring additionally to FIG. 3, there is illustrated the division of a mobile switching center service area 105 into a plurality of location areas (LA) with a location area (LA) further divided into a plurality of cells (C) 180. In FIG. 3, the location area LA6 170F of FIG. 2, has been subdivided into six cells C1 180A, C2 180B, C3 180C, C4 180D, C5 180E, and C6 180F. A location area (LA) can have a plurality of cells (C) but belongs to only one mobile switching center 100. A mobile station 155 can move between the various cells (C) of a location area (LA) without updating the location information contained in the visitor location register 120. Once a mobile subscriber 155 moves between location areas (LA), however, the visitor location register 120 must be updated with new location information.

Figure 4:
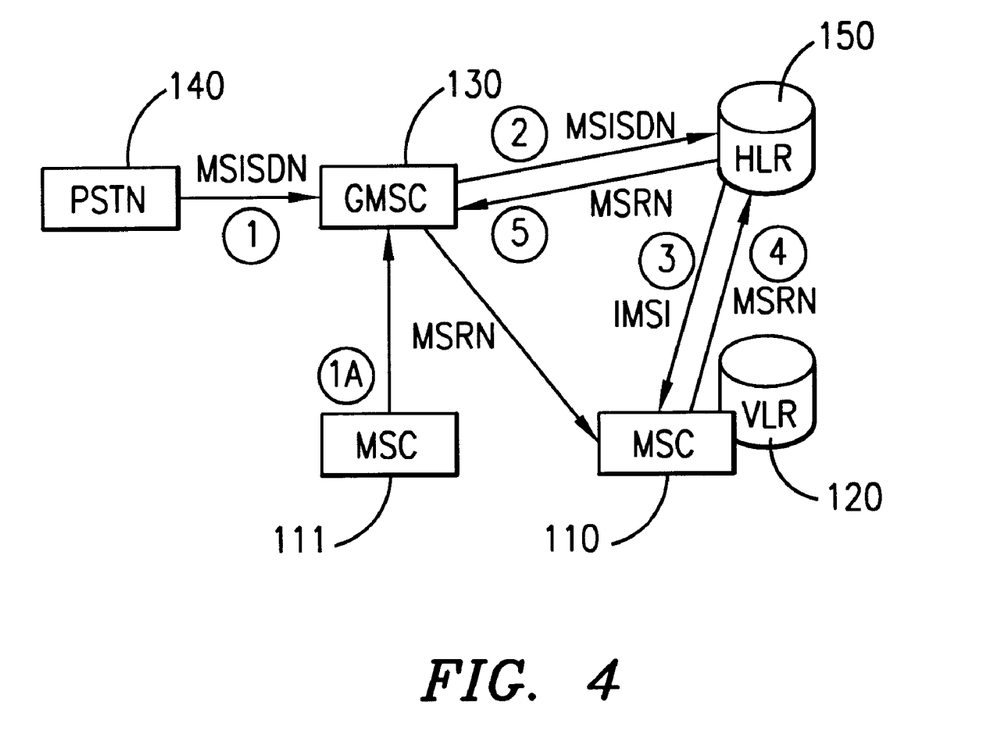
FIG. 4 is a flow diagram illustrating a process for initiating a telephone call to a mobile station using the Global System for Mobile communication standard.

Referring additionally to FIG. 4, there is illustrated a flow diagram for initiating a telephone call to a mobile station 155 using the Global System for Mobile communications standard. The flow diagram describes a call originating from both a land line routed through the public switched telephone network 140 and a mobile station serviced by the same cellular telephone network 145 servicing the mobile station 155 being called with the distinction that the incoming telephone call from the mobile station originates from another mobile switching center 111 rather than from the public switched telephone network 140.

Each mobile station in a cellular telephone network is normally assigned a mobile station ISDN number (MSISDN). The mobile station ISDN number is unique to each mobile station and is essentially the telephone number of the mobile station 155. When a telephone call is placed from the public switched telephone network 140, or a mobile station serviced by mobile switching center 111, the public switched telephone network 140 or the mobile switching center 111 passes the mobile station ISDN number to the gateway mobile switching center 130 (step 1) and (step 1A), respectively. After receiving the mobile station ISDN number, the gateway mobile switching center 130 presents the mobile station IDSN number to the home location register 150 (step 2). The home location register 150 accesses its database to determine which mobile switching center 110 is currently servicing the mobile station. In order to obtain a temporary number for routing, the home location register 150 provides the mobile switching center 110 with an international mobile subscriber identity (IMSI) which uniquely identifies a subscriber in the cellular telephone network (step 3). The mobile switching center 110, in turn, provides the home location register 150 with a Mobile Station Roaming Number (MSRN) (step 4), and the home location register 150 provides the gateway mobile switching center 130 with the mobile station roaming number (step 5). The gateway mobile switching center 130 uses the mobile subscriber roaming number to route the incoming call (step 6) to the mobile switching center 110 currently serving the mobile subscriber 155. Once the gateway mobile switching center 130 has routed the telephone call to the mobile switching center 110, communication is established between the calling party, calling from a land line routed through the public switched telephone network 140 or from a mobile station serviced by MSC 111, and the mobile subscriber 155 of the cellular telephone network 145.

Figure 5:
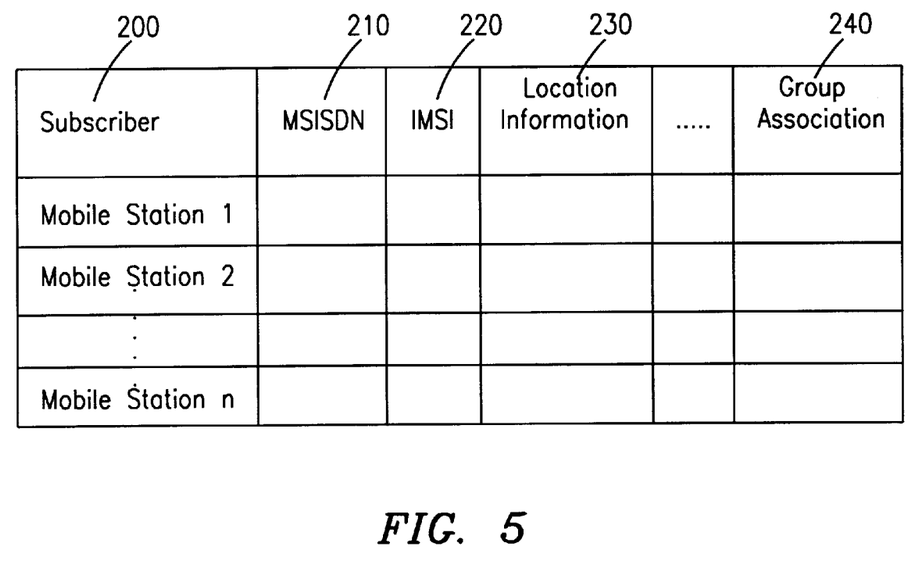
FIG. 5 illustrates a list of entries to a home location register database.

Referring additionally to FIG. 5, there are illustrated entries to a home location register database. The entries to the home location register database listed in FIG. 5 are not an exhaustive list of all information contained in the home location register 150 database using current Global System for Mobile communication standards, but rather, depict entries which are pertinent to the present invention. Contained within the home location register 150 database is a list of all mobile stations 155, column 200, serviced by the cellular telephone network 145. Associated with each mobile station entry is a mobile station ISDN number, column 210. This number is essentially the telephone number of the mobile station 155 which is used to place a telephone call to the mobile station 155. Further associated with each mobile station entry is an international mobile subscriber identity, column 220. This is a unique identity assigned to each of the mobile stations 155 serviced by the cellular telephone network 145. Another entry associated with each mobile station 155 is the current location of the mobile station 155, column 230. Entries listed in columns 200, 210, 220, and 230 are standard entries currently included in the home location register 150 database using the Global System for Mobile communication protocol. One embodiment of the present invention provides for the addition of an entry associated with each mobile station 155 which identifies the mobile station 155 as being associated with one or more groups, column 240. The association of a mobile station 155 with a group is established when the mobile station 155 is added to the cellular network 145 and can be updated as needed. The home location register 150 may also contain an entry listing the dispatcher's land line telephone number or cellular telephone number necessary to contact the dispatcher 160 in the event that a mobile unit 155 (e.g., taxi or delivery truck) originates the dispatch call.

As mentioned earlier, the home location register 150 contains an exhaustive list of all subscribers to the cellular telephone network. Each visitor location register 120 contains a copy of the information contained in the home location register 150 for all mobile stations 155 currently serviced by the mobile switching center 110 associated with the visitor location register 120. As a mobile station 155 moves from one mobile switching center service area 100 to another, the information pertaining to that mobile station 155 is deleted from the visitor location register 120 associated with the mobile switching center 110 formerly servicing the mobile station 155 and is added to the visitor location register 120 of the new mobile switching center 110 servicing the mobile station 155. The mobile station 155 location information is subsequently updated in the home location register 120 database.

To provide a dispatch system using the cellular telephone network 145, the present invention associates a group of mobile stations 155 with a particular dispatch service using the group assignment entry, column 240. Each mobile station 155 can have a distinct mobile station ISDN number, column 210 with a separate telephone number identifying the group association or, alternatively, each mobile station 155 can be assigned an identical mobile station ISDN number with the cellular telephone network 145 recognizing that each member of the group has been assigned the same mobile station ISDN number, column 210 which also can be the dispatch group telephone number. For example, assume that a taxi company located within the service area 105 of a cellular telephone network 145 wishes to convert from a radio based dispatch system to a cellular telephone network based dispatch system. Each taxi within the fleet is equipped with a cellular telephone, also referred to as a mobile station 155. Each of these mobile stations 155 is registered in the home location register 150 database, column 200. Although each mobile station 155 may have a unique mobile station ISDN number, or share a common mobile station ISDN number each taxi which is part of the dispatch group is assigned a unique international mobile subscriber identity, column 220.

In one embodiment of the present invention, each mobile station 155 of the dispatch group is listed as a member of the taxi service dispatch group in column 240. When the originator of a dispatch call wishes to establish communications with members of the dispatch group, (i.e., taxis in the fleet) the originator uses either a land line telephone or cellular telephone and dials the mobile station ISDN number assigned to the dispatch group. The cellular telephone network 145 recognizes that this is a group call by the group association listed in column 240, or alternatively, in another embodiment of the present invention, by recognizing the shared mobile station ISDN number, column 210. Using either of the two methods to identify the group call, the cellular telephone network 145 establishes separate telephone calls with each of the mobile stations 155 using the international mobile subscriber identity, column 240 and the procedure described in FIG. 4. Each of these calls are conferenced together along with the call originator thereby placing all members of the dispatch group in full duplex communication with one another.

The dispatch group concept is very flexible and allows association or membership with more than one group. For instance, in the example of a taxi service, every taxi is a member of the entire taxi service fleet and is associated with a first telephone number or mobile station ISDN number. Additionally, a particular type of vehicle, such as each station wagon in the fleet of taxis, can be associated with a station wagon dispatch subgroup and assigned a second telephone number. Furthermore, every van in the fleet of taxis can be associated with a third dispatch group and be assigned a third telephone number. Thus, each taxi can have membership in one or more dispatch groups and the dispatch caller can communicate with all taxis, all station wagons, or all vans simply by dialing the telephone number associated with the group to be contacted.

Group association by geographical location is also possible. Since the home location register 120 database contains the current location for all mobile stations 155, the cellular telephone network 145 can be programmed to set up communication based on geographical location in addition to membership association. A telephone number can be associated with a given geographical location such that when the telephone number is dialed, communication with all mobile stations 155 in the chosen geographical area or areas who are also part of a dispatch group are contacted. For instance, in the example of the taxi service, if a taxi dispatcher wishes to contact all taxis in close proximity to an airport, a telephone number can be assigned to contact all members of the taxi dispatch group or subgroup which are currently serviced by the mobile switching center 110 service area 100 located near the airport. Thus, when a dispatcher calls this number the cellular telephone network 145 accesses the home location register 120 database to determine all mobile stations 155 included in the particular taxi dispatch service group which are in the service area 100 serviced by the mobile switching center 110 in geographical proximity to the airport. The call is then established between these taxis and the dispatcher. Since the granularity of location information contained in the home location register 120 extends to the location area (LA) of a mobile switching center service area 100, the cellular telephone network can distinguish the location of members down to the location area (LA).

Even further selectivity is possible in creating dispatch group membership. For example, a taxi service may find it advantageous to be able to communicate only with all vans located in close proximity to the airport. In such a case, a telephone number would be assigned to contact all vans of the dispatch group located within the local area (LA) of the mobile switching center 110 servicing the geographical area in the vicinity of the airport. Thus, when a dispatcher calls this number only vans located in proximity to the airport will be contacted.

Figure 6:
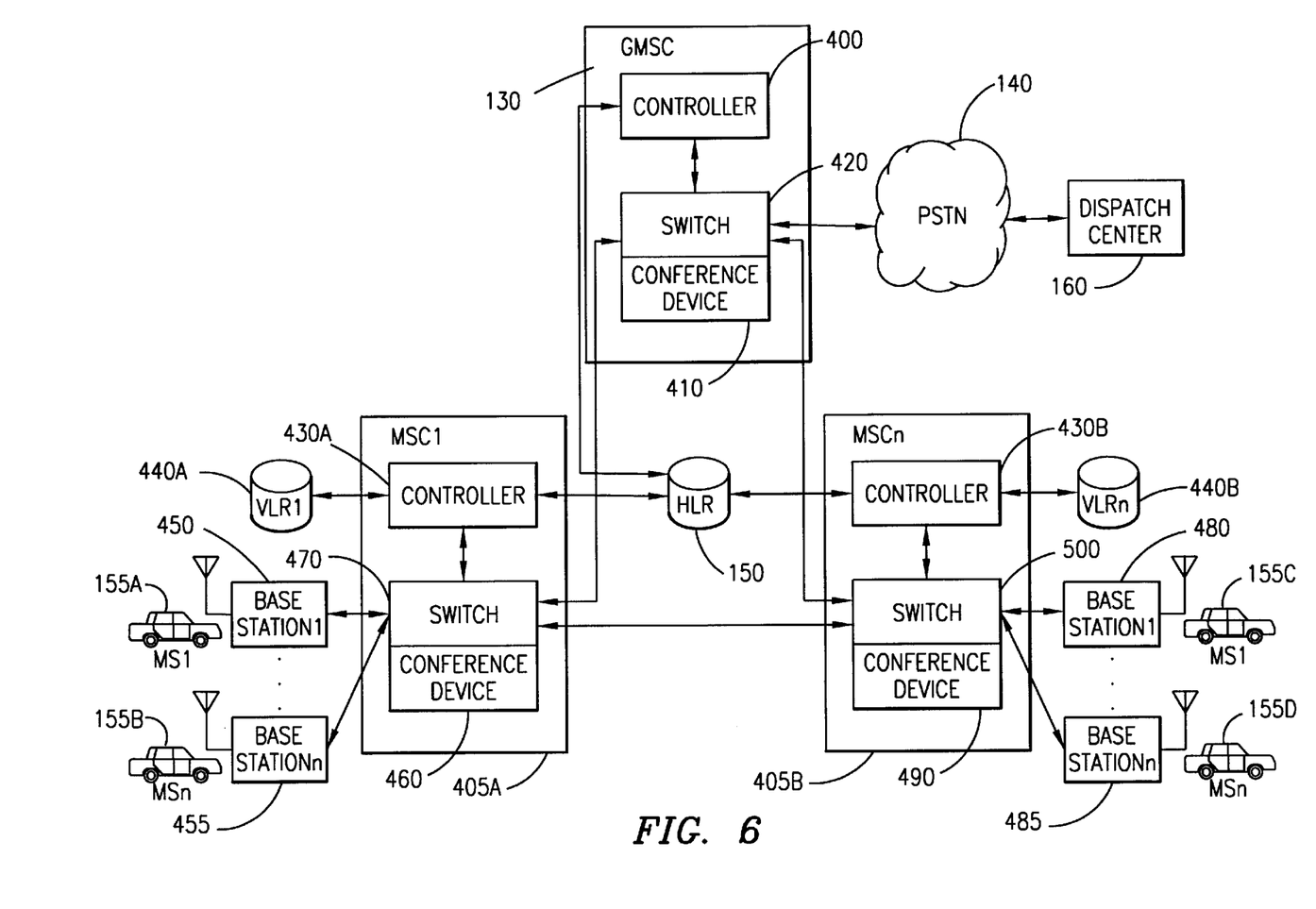
FIG. 6 is a block diagram of a cellular telephone network embodying the present invention.

Referring additionally to FIG. 6, there is illustrated a cellular telephone network 145 embodying the present invention. When a dispatcher located in the dispatch center 160 wishes to communicate with mobile stations 155A, 155B, 155C, and 155D which are members of a particular dispatch group, the dispatcher places a telephone call using the telephone number assigned to the dispatch group to be contacted. This call can be placed using either a land line telephone or a cellular telephone. When the call is placed over a land line, the call is routed through the public switch telephone network 140 to the gateway mobile switching center 130. If the call is placed using a cellular telephone serviced by the subject cellular telephone network 145, the call is routed from the mobile switching center 110 servicing the mobile station placing the call to the gateway mobile switching center 130. In either event, the controller 400 of the gateway mobile switching center 130 handles the incoming telephone call in a manner similar to any telephone call. The gateway mobile switching center 130 accesses the home location register 150 database to begin the telephone call set up procedure described in FIG. 4 by providing the home location register 150 with the mobile station ISDN number. The home location register 150 identifies the call as being placed to a dispatch group either implicitly by recognizing multiple mobile station entries assigned to the mobile station ISDN number, column 210 of FIG. 5, or explicitly by association with the dispatch, column 240 of FIG. 5. In either case, the home location register 150 informs the controller 400 of gateway mobile switching center 130 that the incoming is a dispatch telephone call.

In one embodiment of the present invention the home location register 150, after recognizing the incoming call to be a dispatch group call, sends the international mobile subscriber identity for each of the mobile stations having membership in the dispatch group 155A–D to the respective mobile switching centers 405A and 405B currently servicing the individual mobile stations 155A–D. The mobile switching centers 405A–B, return a mobile station routing number for each of the mobile stations 155A–D which they are servicing, to the home location register 150 which forwards them to the global mobile switching center 130. The global mobile switching center 130 establishes an individual telephone call with each of the mobile stations 155A–D through the mobile switching centers 405A and 405B. As these calls are established, the gateway mobile switching center 130 links all of the individual telephone calls to the mobile stations 155A—D together with the connection from the dispatch center 160 using a conferencing device 410 and a switch 420 providing a full duplex communication between the dispatch center 160 and the mobile stations 155A–D.

In another embodiment of the present invention, the home location register 150, after recognizing the incoming call as a dispatch group call, determines which mobile switching centers 405A and 405B are currently serving members of the dispatch group by accessing the home location register 150 database. Instead of establishing a separate telephone call to each of the mobile stations 155A–D by providing an international mobile subscriber identity for each mobile station to the mobile switching centers 405A and 405B, each mobile switching center 405A and 405B is provided with a single distinct international mobile subscriber identity. The mobile application part message of the global system for communication standard is modified to identify the call as a dispatch group call so that the mobile switching centers 405A and 405B know to route the call to multiple mobile stations 155 of the particular dispatch group. Since the visitor location register 405A and 405B for each mobile switching center 405A and 405B contains a copy of the home location register database 150 for the mobile stations 155 in their service area 100, each mobile switching center 405A and 405B can independently determine which mobile stations 155 form the dispatch group in their respective service areas 100. Providing a single international mobile subscriber identity to each of the mobile switching centers 405A and 405B results in each mobile switching center 405A and 405B returning a single mobile subscriber routing number for each mobile switching center 405A and 405B rather than multiple mobile station routing numbers allocated for each mobile station 155. The home location register 150 forwards the mobile station routing number received from each mobile switching center 405A and 405B to the gateway mobile switching center 130. The gateway mobile switching center 130 establishes communication with each of the mobile switching centers 405A and 405B serving mobile stations which have membership in the dispatch group using the mobile station routing numbers.

The mobile switching centers 405A and 405B, receive the mobile subscriber routing number from the gateway mobile switching center 130 and recognize the call as a dispatch group call. Controllers 430A and 430B access the respective databases contained within the associated visitor location registers 440A and 440B to obtain a list of all mobile stations 155 having membership in the dispatch group and which are serviced by the respective mobile switching centers 405A and 405B. The controller 430A of mobile switching center 405A then establishes a telephone call with mobile subscriber 155A located in a first location area (LA) serviced by the mobile switching center 405A using base station 450. The controller 430A further establishes a telephone call with mobile station 155B located in a second location area (LA) serviced by the mobile switching center 405A using base station 455. The controller continues to establish calls until all mobile stations 155 serviced by the mobile switching center 405A have been contacted or attempted to be contacted. The controller 430A then conferences together the telephone calls with each of the mobile stations 155A–155B together with the incoming telephone call from the gateway mobile switching center 130 which was established earlier using the mobile station routing number. This conference call provides full duplex communication between the mobile stations 155A–155B to the gateway mobile switching center 130.

In a similar manner, controller 430B of mobile switching center 405B accesses the database contained within the visitor location register 440B to ascertain all mobile stations 155C–155D located within the service area of the mobile switching center 405B. Telephone calls are established to the mobile station 155C using base station 480 and mobile station 155D using base station 485. Telephone calls continue to be established throughout the various location areas serviced by the mobile switching center 405B until all mobile subscribers within the service area of the mobile subscriber service center 405B have been contacted or attempted to be contacted. The controller 430B then conferences together all of the telephone calls with the mobile stations 155C–155D, together with the incoming telephone call from the gateway mobile switching center 130 using conference device 490 and switch 510. This conference call provides a full duplex communication between the mobile stations 155C–155D and the gateway mobile switching center 130.

In a similar fashion, all mobile switching centers 110 which are part of the cellular telephone network 145 connect mobile stations 155 which are members in the dispatch group in their service areas 100 to the gateway mobile switching center 130. The gateway mobile switching center 130 uses conference device 410 and switch 420 to conference all of these calls together with the incoming call from dispatch center 160. This hierarchal conferencing of telephone calls establishes a full duplex communication between the dispatch center 160 and all mobile stations 155A–155D, which are members of the dispatch group being contacted. This embodiment of the present invention, minimizes the number of communications paths used to establish communication between the multiple mobile switching centers and the gateway mobile switching center.

In a third embodiment of the present invention, the home location register 150, upon receiving a mobile subscriber ISDN number from the gateway mobile switching center 130, recognizes the call as a dispatch group call which is limited to a certain geographical location or locations. The geographical locations can be a single location area (LA) of a single mobile switching center 110 or can be multiple location areas located in a single or multiple mobile switching center service areas 100. In any event, telephone calls are selectively established with each of the mobile stations 155 included in the dispatch group which are currently in the location area (LA) or areas to be contacted using either of the two embodiments of the present invention previously described.

For all of the embodiments of the present invention, as mobile stations 155 move from one mobile switching center service area 100 to another, the telephone call for the mobile station 155 will be handed-off to the new mobile switching center 110 servicing the new service area 100. Likewise, the mobile station information contained in the home location register 150 and the visitor location register 120 will be added to the new visitor location register 120 and deleted from the former visitor location register 120. As stated earlier, a dispatch call can be placed by a mobile station 155 including members of the dispatch group. Thus, any member of the dispatch group can contact all members by placing a telephone call to the dispatch group telephone number. To prevent unauthorized telephone calls to the dispatch group, the cellular telephone network can require the caller to enter a password or access code.

Figure 7:
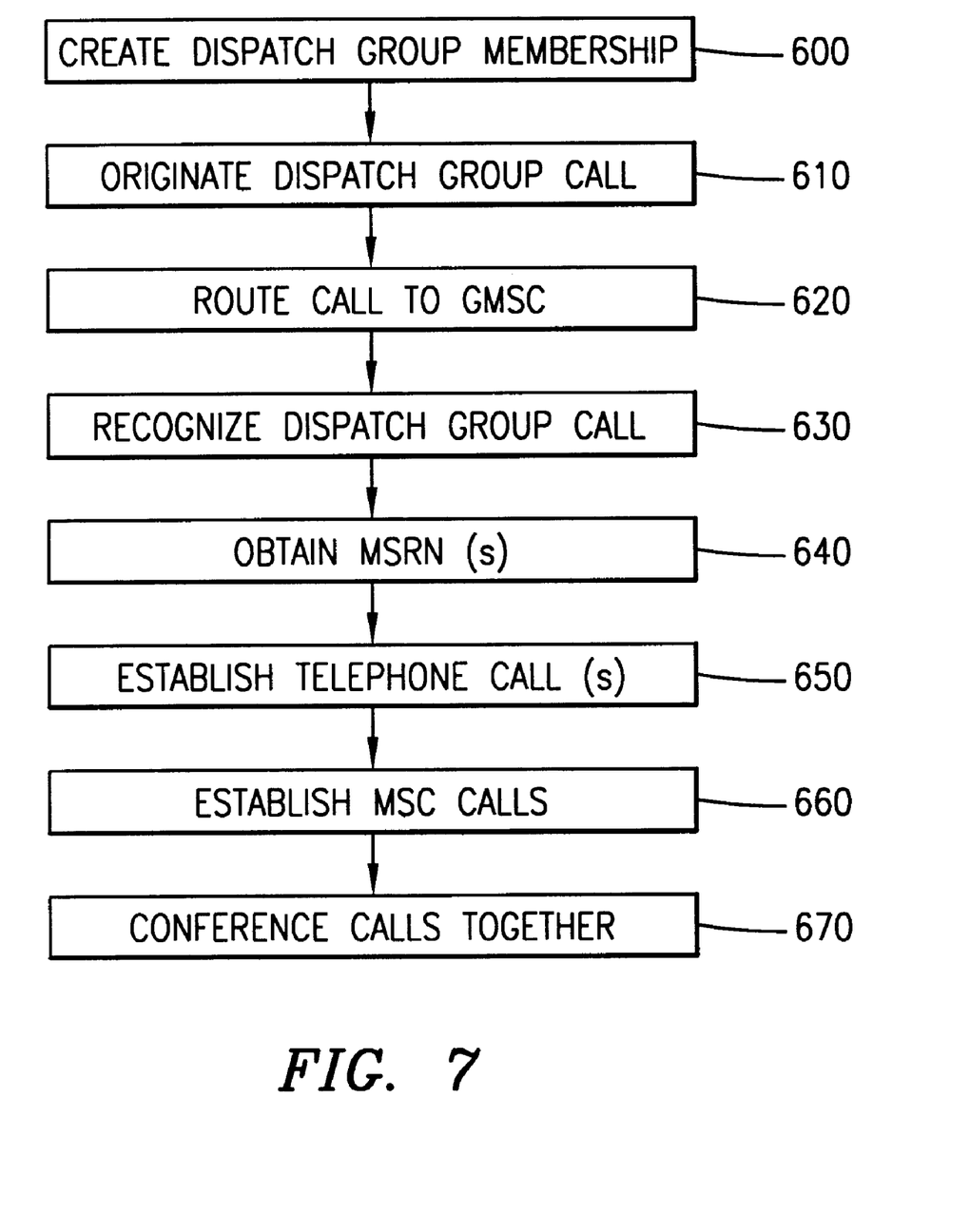
FIG. 7 is a flow diagram illustrating a process for providing a dispatch system in a cellular telephone network practicing the present invention.

Referring additionally to FIG. 7, there is illustrated a flow diagram for providing a dispatch system in a cellular telephone network 145 practicing the present invention. To provide a dispatch system in the cellular telephone network 145, the cellular telephone provider must first create a dispatch group (step 600). To create the dispatch group, a cellular telephone network provider enters all mobile stations 155 which have membership in the particular dispatch group into the home location register 150 and includes their association with dispatch groups. Each dispatch group is assigned a separate telephone number which corresponds to the mobile station ISDN number or telephone number. To establish communications between members of the dispatch group, a dispatcher originates a dispatch group call (step 610), by dialing the telephone number assigned to the particular dispatch group to be contacted. As has been described, this call is routed to the gateway mobile switching center 130 (step 620). The gateway mobile switching center 130 passes the mobile station ISDN number to the home location register 150 which recognizes the call as a dispatch group call (step 630). The home location register 150 recognizes the telephone call as a dispatch group call either explicitly by association with a dispatch group, as described in column 240 of FIG. 5, or implicitly, by the home location register 150 realizing that multiple mobile stations 155 have been assigned the same mobile station ISDN number, as is also described in FIG. 5. Upon recognizing the telephone call as a dispatch group call, the home location register 150 obtains mobile station routing numbers (step 640), from each of the mobile switching centers 110 currently servicing a member or members of the dispatch group being contacted.

In one embodiment of the present invention, a mobile station routing number is provided for each of the mobile stations 155 which are part of the dispatch group. In another embodiment of the present invention, a single mobile station routing number is provided for each of the mobile switching centers 110 currently servicing one or more mobile stations 155. In the latter embodiment, a single mobile station routing number is provided to the home location register 150 whether the mobile switching center 110 has one or multiple mobile stations 155 in its service area 100 which are part of the dispatch group. When the home location register 150 receives the mobile station routing numbers, it communicates the mobile station routing numbers to the gateway mobile switching center 130. The gateway mobile switching 130 center establishes a telephone call (step 650), with each mobile switching center 110 currently servicing members of the dispatch group. Each of the contacted mobile switching centers 110 establish a telephone call with each of the mobile stations 155 having membership in the dispatch group currently in the service area 100 of the particular mobile switching center 110 (step 660). As the mobile stations 155 are contacted, they are conferenced together to create a full duplex communication path between the dispatcher and the members of the dispatch group being contacted (step 670).

In one embodiment of the present invention, each mobile station 155 has a separate telephone call connection to the gateway mobile switching center 130 and the telephone calls to the mobile stations 155 and the dispatcher are conferenced together at the gateway mobile switching center 130. In another embodiment of the present invention, all mobile stations 155 which have been contacted within a given mobile switching center service area 100 are conferenced together at the particular mobile switching center 110. Each conference call at the mobile switching centers 110 is connected via a single telephone call to the gateway mobile switching center 130 from each mobile switching center 110 where they are conferenced together with the dispatcher creating a hierarchal conferencing. At this point, full duplex communication will be established with the mobile stations and the dispatcher. The conferencing of telephone calls described in the various embodiments of the present invention operates on all parties who have answered the telephone call. Mobile stations which are unavailable or do not answer the call within a specified number of rings are not added to the conference call.

Although an embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. An apparatus for deploying a dispatch system in a cellular telephone network comprising:

a central database accessible through the cellular telephone network for listing a plurality of mobile stations assigned a common telephone number, each mobile station having membership in a dispatch group, and the database further listing the current location of each mobile station; and a gateway facility forming part of the cellular telephone network and capable of accessing the central database, the gateway facility for routing telephone calls from a dispatch call originator to the mobile stations having membership in the dispatch group listed in the central database.

2. The apparatus recited in claim 1, wherein the central database further includes a common telephone number associated with each mobile station having membership in the dispatch group, the telephone number for identifying an incoming telephone call placed to the common telephone number as a dispatch group call and further, for identifying the mobile stations having membership in the dispatch group.

3. The apparatus recited in claim 2, wherein the central database further includes a listing for a land line telephone number assigned to the dispatch center, the dispatch center being associated with the dispatch group.

4. The apparatus recited in claim 3, wherein the central database further includes an entry associated with each mobile station having membership in the dispatch group, the entry identifying the dispatch group in which the associated mobile station has membership.

5. The apparatus recited in claim 4, wherein the entry associated with each mobile station lists a plurality of dispatch groups in which the associated mobile station has membership.

6. The apparatus recited in claim 5, wherein the central database is a home location register in a Global System for Mobile communication based cellular telephone network.

7. An apparatus for deploying a dispatch system in a cellular telephone network comprising:

a central database for listing a plurality of mobile stations and a dispatch center forming the dispatch group and the central database further listing the location of each mobile station and the dispatch groups in which each mobile station and dispatch center have membership;

a gateway mobile switching center forming part of the cellular telephone network responsive to an incoming telephone call to the dispatch group, the gateway mobile switching center for accessing the central database to identify the members of the dispatch group and establishing communication with each mobile station having membership in the dispatch group; and a plurality of mobile switching centers in communication with the gateway mobile switching center, the plurality of mobile switching centers for establishing a wireless communication with each mobile station having membership in the dispatch group and located within the respective mobile switching center service areas, the plurality of mobile switching centers further for establishing communication between the gateway mobile switching center and the mobile stations.

8. The apparatus recited in claim 7, wherein the gateway mobile switching center establishes an individual telephone call with each mobile station in the dispatch group, the gateway mobile switching center further for conferencing the telephone calls to each mobile station together with the incoming telephone call from the dispatch center using a conferencing device.

9. The apparatus recited in claim 7, wherein the gateway mobile switching center establishes and conferences together, a single telephone call to each mobile switching center servicing at least one mobile station having membership in the dispatch group together with the incoming telephone call, the conferencing of calls accomplished using a first conference device, and each mobile switching center establishing a wireless communication with each mobile station within their respective service areas having membership in the dispatch group, the mobile switching centers further conferencing together the individual wireless communications to the mobile stations together with the call with the gateway mobile switching center using a second conferencing device.

10. An apparatus for deploying a dispatch system in a cellular telephone network comprising:

a central database forming part of the cellular telephone network for listing a plurality of mobile stations, each mobile station having membership in one or more dispatch groups, the database further including the current location of each mobile station;

a gateway mobile switching center forming part of the cellular telephone network for interfacing between a dispatch call originator and dispatch group members;

a plurality of mobile switching centers forming part of the cellular network for effectuating wireless communication with the mobile stations;

a database associated with each mobile switching center containing a copy of a portion of the central database associated with mobile stations currently being serviced by the respective mobile switching centers;

means for up dating mobile station location in the central database and the databases associated with each mobile switching center when the mobile station change location; and means for establishing a conference telephone call between members of the dispatch group based on dispatch group listing of mobile stations and their locations contained in the central database and in the databases associated with the mobile switching centers.

11. A method for deploying a dispatch system in a cellular telephone network comprising the steps of:

tracking the location of a plurality of mobile stations within a home location register and a plurality of visiter location registers of a cellular telephone network; and establishing a conference call between members of the dispatch group listed in the home location register, the call being established with the mobile stations at their tracked location.

12. The method of claim 11, wherein the step of creating a dispatch group list includes the steps of:

listing each member of the dispatch group in the home location register;

assigning a common telephone number to members of the dispatch group in the home location register;

listing, in the home location register, all dispatch groups in which each mobile station is a member;

recording the tracked location of each mobile station in the home location register; and maintaining a copy, in each visiter location register, of a portion of the central database associated with the mobile stations located within a service area of the respective visiter location register databases.

13. The method of claim 11, wherein the step of establishing a conference call between members of the dispatch group further includes the steps of:

establishing individual calls to each mobile station having membership in the dispatch group; and conferencing together the individual calls at a gateway mobile switching center.

14. The method of claim 11, wherein the step of establishing a conference call between members of the dispatch group further includes the steps of:

establishing individual calls between a plurality of mobile switching centers and the mobile stations having membership in the dispatch group and located in the respective service areas of the mobile switching center;

conferencing together the individual calls to the mobile stations at the respective mobile switching centers; and conferencing together at a gateway mobile switching center the conferenced calls at the mobile switching centers using a single call to each mobile switching center.

* * * * *